C. W. CANFIELD.
AUTOMOBILE LAMP.
APPLICATION FILED JULY 1, 1915.

1,210,146.

Patented Dec. 26, 1916.
2 SHEETS—SHEET 1.

WITNESSES
Frank C. Palmer
Walton Harrison

INVENTOR
Carlton W. Canfield
BY
ATTORNEYS

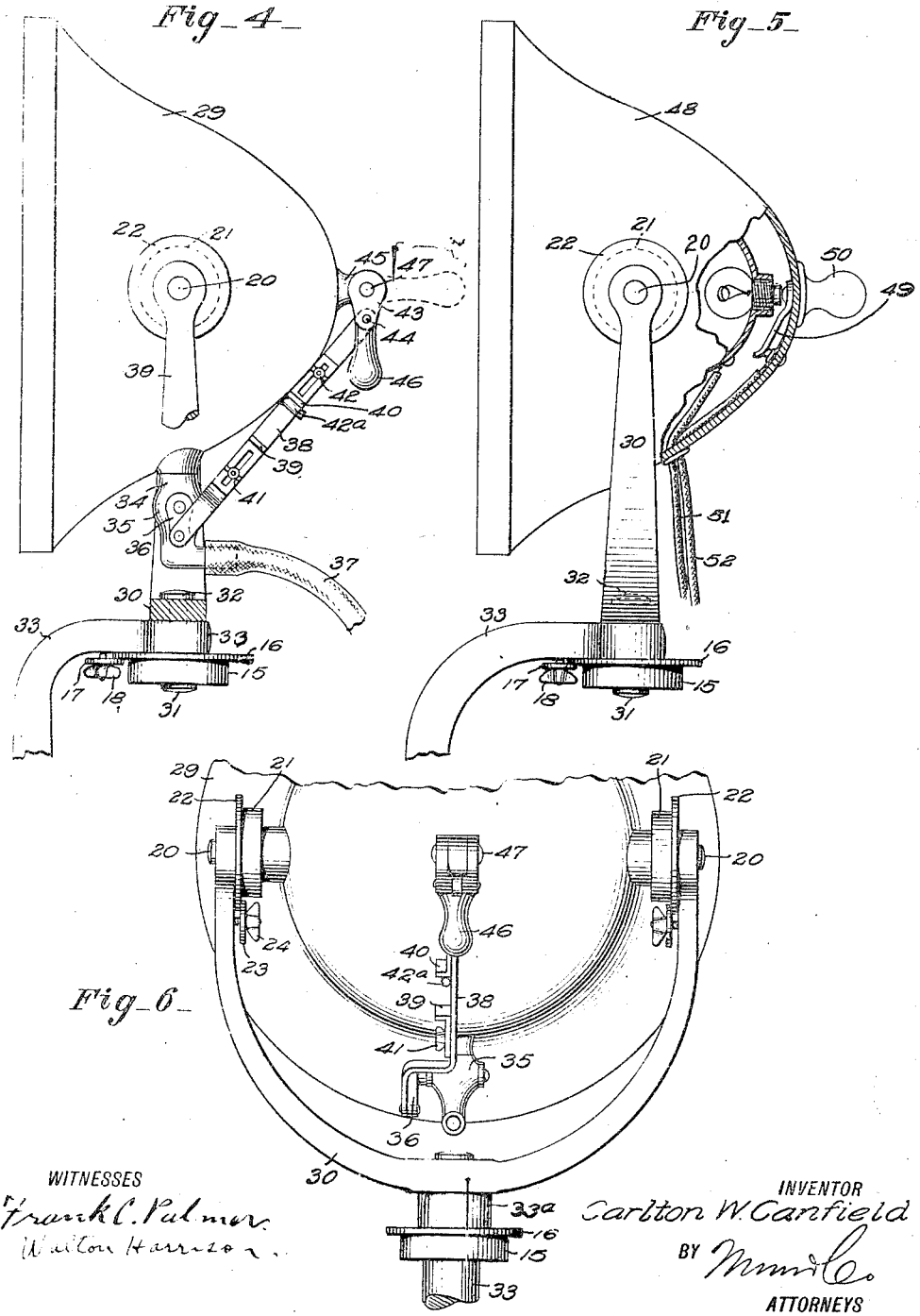

UNITED STATES PATENT OFFICE.

CARLTON W. CANFIELD, OF BROWNTON, MINNESOTA.

AUTOMOBILE-LAMP.

1,210,146. Specification of Letters Patent. Patented Dec. 26, 1916.

Application filed July 1, 1915. Serial No. 37,498.

*To all whom it may concern:*

Be it known that I, CARLTON W. CANFIELD, a citizen of the United States, and a resident of Brownton, in the county of McLeod and State of Minnesota, have invented a new and Improved Automobile-Lamp, of which the following is a full, clear, and exact description.

My invention relates to automobile lamps, my more particular purpose being to provide a lamp with means under control of the operator whereby the lamp may be instantly shifted into different positions and yet when released from any of said positions will automatically return to a predetermined normal position.

My invention further contemplates mechanism for enabling the operator to shift the position of the lamp as just stated to turn the light on and off as desired, using a single manually operated member for the double purpose of shifting the lamp and controlling the light thereof.

Reference is made to the accompanying drawings forming a part of this invention in which like letters of reference indicate like parts.

Figure 1:
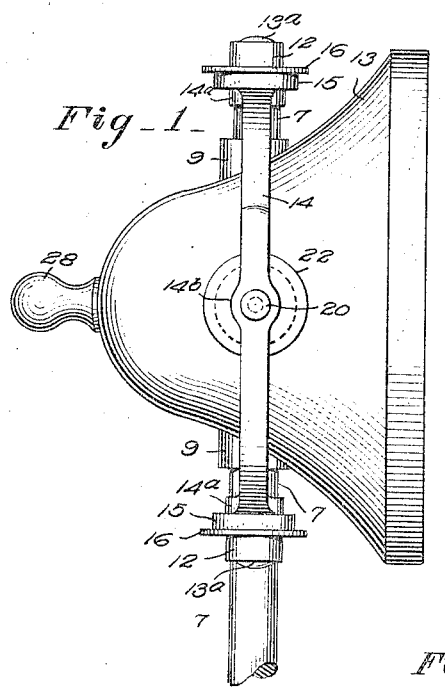
Figure 3:
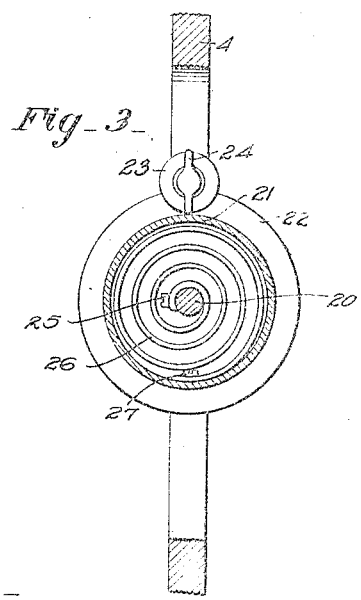
Figure 2:
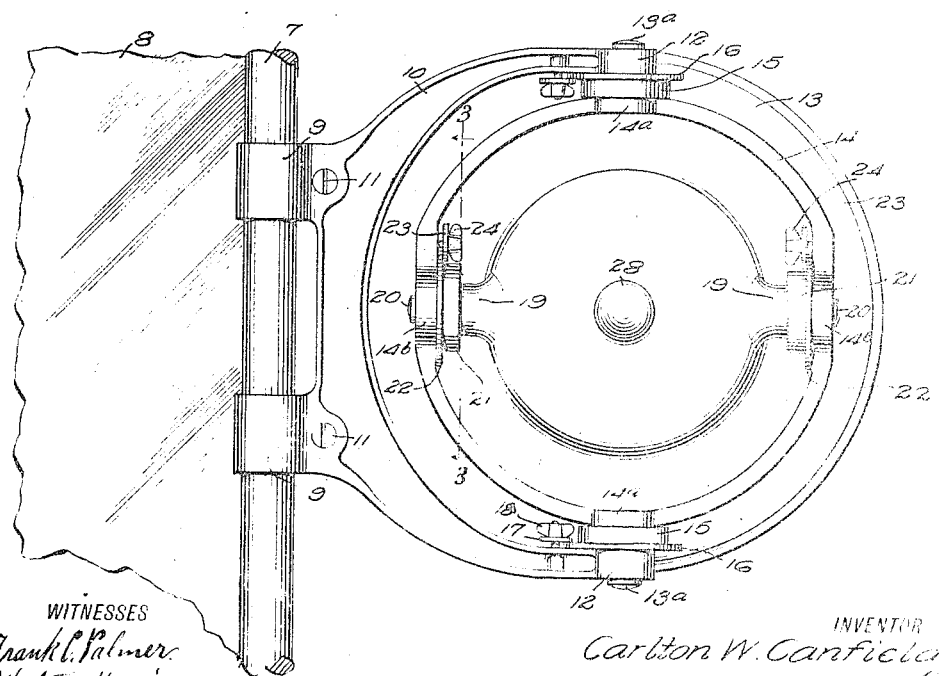

Figure 1 is a side elevation showing one form of automobile lamp with its spring mountings; Fig. 2 is a rear elevation of the same; Fig. 3 is a section on the line 3—3 of Fig. 2, looking in the direction of the arrows; Fig. 4 is a side view partly in section and partly in elevation showing another form of my lamp, which in this instance is provided with a handle for the double purpose of shifting the lamp and of controlling a supply of gas thereto; Fig. 5 is a side elevation of still another form of lamp, which in this instance is lighted by electricity, the device being provided with a common means for enabling the operator to shift the position of the lamp and also turn the electric current on and off; Fig. 6 is a fragmentary rear elevation of the mechanism appearing in Fig. 4.

The dashboard of the automobile appears at 8 and one of the side standards therefor at 7. Mounted upon this standard are a pair of collars 9 supporting a yoke 10 having substantially a crescent form and carrying a pair of screws 11 for tightening the collars 9. The yoke 10 also carries a pair of annular bearings 12 which are in axial alinement with each other. A gimbal ring 14 is provided with trunnions 13ª which extend through the bearings 12 so that the gimbal ring 14 is revoluble relatively to the yoke 10. The gimbal rings 14 are provided with enlarged portions 14ª to which the trunnions 13ª are rigidly secured. The lamp casing, or body portion of the lamp, has substantially the form of a bell and is shown at 13. Each trunnion 13ª extends through an annular casing 15 and annular disks 16 secured rigidly to said casing. Engaging each annular disk 16 is a washer 17 controllable by a thumb nut 18. By loosening this thumb nut the annular disks 16 may be turned angularly upon the trunnions 13ª as a center and thus adjusted into any desired position. After being thus adjusted they may be clamped rigidly by turning the thumb nut 18 so as to press the washer 17 against the annular disk 16.

The lamp casing 13 is provided with a pair of trunnions 19, the latter having portions 20 of reduced diameter, these reduced portions extending through the wall of the gimbal ring 14 which is slightly widened at 14ᵇ for this purpose, as may be understood from Figs. 1 and 2. Encircling each reduced portion 20 is an annular casing 21 and an annular disk 22, these parts corresponding to the annular casing 15 with its annular disk 16 just described, and being similarly adjustable by aid of a washer 23 and thumb nut 24. The mechanism within the casing 15 is exactly like that within the casing 21 and may be understood by reference to Fig. 3. A screw 25 connects the inner end of a spiral spring 26 with the trunnion, and the outer end of the spiral spring is connected by a screw 27 with the casing. By this arrangement the trunnion has a spring connection with the casing 15 or 21 and therefore is normally held in a predetermined position relatively to other parts, the arrangement being such, however, that when displaced from said position, by a torque or turning motion the parts when released will return to their normal position. A handle 28 is mounted upon the rear portion of the lamp casing.

From the foregoing description the action of the mechanism appearing in Figs. 1, 2 and 3 may be readily understood. The operator, by grasping the handle 28, may turn the lamp casing 13 into an infinite number of angular positions, yet when the handle 28 is released the lamp casing is instantly restored to its predetermined normal position. The operator by manipulating the thumb nuts 18—24 and turning the annular disks 16—22 can change the normal position of the lamp casing. Since the trunnions 13ª are vertical and the trunnions 20 are horizontal the lamp casing may be moved either in a vertical plane or in a horizontal plane and in any position between a vertical plane and a horizontal plane. The normal position occupied by the lamp may also be adjusted either vertically or horizontally or in any intermediate angular position. If now the automobile be traveling along a road, the operator by grasping the handle 28 can direct the light of the lamp either straight ahead or to either side, or up or down as he may desire, and when he releases the lamp casing it will be turned to its normal position; that is, into any position for which adjustment has previously been made.

In the form shown in Fig. 4 the lamp casing appears at 29 and is journaled upon a yoke 30 to swing in a vertical plane. The yoke 30 is secured to a pin 31 having a head 32, this pin extending through a bearing 33ª carried by a bracket 33, (which is secured to body of car.) In this instance the casing 15 with its annular disk 16 and contained spring mechanism is mounted upon the pin 31. The thumb nut 18 and washer 17 are carried by the bracket 33. The lamp casing is thus adjustable as above in an infinite number of angular directions and is movable by hand into such infinite number of directions.

The lamp shown in Fig. 4 is supplied with gas through a pipe 34 provided with a valve 35. The valve 35 has a crank 36 whereby it is actuated. A flexible pipe 37 is connected with this valve and delivers gas through the same to the lamp. A pitman 38 is pivotally connected to the crank 36 (see Fig. 6) and carries a pair of substantially L-shaped abutments 39 and 40, the positions of these abutments being adjustable, and controllable by thumb nuts 41 and 42. A pin 42ª is carried by the lamp casing 29 and extends between the abutments 39—40. A handle 43 is connected by a pivot pin 44 with the upper end of the pitman 38. The handle 43 is further provided with a portion 46 of convenient form to be grasped. The lamp casing 29 carries a boss 45, the handle 43 being pivotally connected to this boss by a pivot pin 47. The valve 35 as controlled by the crank 36 is an ordinary regulating gas valve, so arranged that when the crank is thrown into its two extreme positions the gas is simply curtailed to a minimum or allowed to flow at a maximum. In order to adjust the parts the cleats 39 and 40 are released and moved into such position that when the handle 46 is down there will be just a little gas flame, and when the handle 46 is raised into the position indicated by dotted lines in Fig. 4, there is a full flow of gas. Each cleat, when thus adjusted, is secured firmly in position. By this arrangement a sufficient flow of gas can in an instant be available for purposes of a search light of great power, but in another instant the light can be reduced to a point where, if desired, it becomes negligible.

With the form of lamp shown in Figs. 4 and 6 the operator can use the handle 43 for the double purpose of controlling the flow of gas to the lamp and of shifting the lamp bodily into different angular positions. When the handle is depressed, as indicated by full lines in Fig. 4, there is a small flow of gas to the lamp. With the handle extended, as indicated by dotted lines in this figure, the gas is turned on full. According to the distance between the abutments 39 and 40 the lamp casing may be given considerable movement without interfering in any manner with the complete control of the flow of gas. If for this purpose an adjustment of the abutments 39 and 40 is needed, such adjustment may be brought about as above described by aid of the thumb nuts 41 and 42.

In the form of lamp shown in Fig. 5, the mounting of the lamp body 48 is substantially the same as in the construction shown in Figs. 4 and 6. The lamp body, however, carries a switch 49 connected with the handle 50 and controllable thereby. The operator by turning the handle 50 causes the switch to be opened or closed. Electrical conductors 51 and 52 are used to supply electricity to the lamp. The operator uses the handle 50 for the double purpose of directing the lamp and of stopping and starting the flow of current for energizing the lamp.

What I claim is:—

1. In an automobile lamp, the combination of a supporting frame, a lamp body carried by said supporting frame, spring connections intermediate said frame and said lamp body for automatically restoring said lamp body into a predetermined position from which it may be displaced by hand, and adjusting means whereby the normal position assumed by the lamp body may be changed.

2. An automobile lamp, comprising a yoke, a gimbal ring movable relatively to said yoke, a spring connection between said gimbal ring and said yoke, a lamp body journaled upon said gimbal ring, and a spring connection between said lamp body and said gimbal ring.

3. A device of the character described, comprising a yoke, a gimbal ring mounted to turn relatively to said yoke, a spring connection between said gimbal ring and said yoke for the purpose of restoring said gimbal ring to a predetermined position relatively to said yoke, a lamp body journaled upon said gimbal ring, a spring connection between said lamp body and said gimbal ring, and mechanism operable at the will of the operator for adjusting said spring mechanism between said gimbal ring and said yoke in order to cause said gimbal ring to normally assume a predetermined position relatively to said yoke.

4. A device of the character described, comprising a yoke, a gimbal ring movable relatively to said yoke, a lamp casing journaled upon said gimbal ring, a spring connection between said lamp casing and said gimbal ring, and mechanism controllable at the will of the operator for adjusting said spring connection in order to confer upon said lamp casing a tendency to normally assume a predetermined position relatively to said gimbal ring.

5. A device of the character described, comprising a standard, a yoke mounted thereupon and having substantially a crescent form, the general plane of said yoke being vertical, a gimbal ring journaled upon said yoke and free to swing in a horizontal plane, a lamp casing journaled upon said gimbal ring and adapted to swing in a vertical plane, a spring connection between said lamp casing and said gimbal ring, and another spring connection between said gimbal ring and said yoke.

6. A device of the character described, comprising a supporting frame, a lamp body carried by said supporting frame, spring connections between the said frame and the lamp body for returning the lamp body to a normal position relative to the frame, when displaced from said position, and mechanism for adjusting said spring connections to change the normal position assumed by the lamp body relative to the supporting frame.

7. A device of the character described, comprising a supporting frame, a lamp casing carried by said supporting frame, means for enabling said lamp casing to be shifted into different angular positions, a handle for enabling the operator to turn said lamp casing into said positions, means connected with the handle for controlling the light of the lamp, means for automatically restoring the lamp casing to a normal position when displaced, and mechanism whereby the normal position assumed by the lamp casing relative to the supporting frame may be changed.

8. The combination of a lamp casing, a support therefor, means for enabling said lamp casing to turn to different angles relatively to said support, a spring connection between said support and said lamp casing for normally restoring said lamp casing to a predetermined position after being displaced therefrom, a casing for said spring connection, an annular disk secured rigidly to said casing, and mechanism including a thumb nut for clamping said annular disk in a predetermined position.

In testimony whereof I have signed my name to this specification in the presence of two subscribing witnesses.

CARLTON W. CANFIELD.

Witnesses:
WILLIAM PEIK,
WILLIAM A. LARAWAY.